United States Patent [19]
Graham et al.

[11] Patent Number: 5,222,154
[45] Date of Patent: Jun. 22, 1993

[54] SYSTEM AND METHOD FOR SPOT COLOR EXTRACTION
[75] Inventors: James J. Graham, Ft. Collins; David W. Boyd, Greeley, both of Colo.
[73] Assignee: Hewlett-Packard Company, Palo Alto, Calif.
[21] Appl. No.: 714,414
[22] Filed: Jun. 12, 1991
[51] Int. Cl.⁵ .............................................. G06K 9/46
[52] U.S. Cl. ...................................... 382/18; 382/17; 358/75; 358/78
[58] Field of Search ............................ 382/17, 18, 51; 395/131; 358/75, 80; 340/701, 703

[56] References Cited
U.S. PATENT DOCUMENTS

| | | | |
|---|---|---|---|
| 4,654,720 | 3/1987 | Tozawa | 358/80 |
| 4,907,075 | 3/1990 | Braudway | 395/131 |
| 5,028,991 | 7/1991 | Sekizawa et al. | 358/80 |
| 5,031,035 | 7/1991 | Abe | 358/80 |
| 5,049,986 | 9/1991 | Aono et al. | 358/80 |
| 5,053,867 | 10/1991 | Yamamoto et al. | 358/80 |
| 5,111,533 | 5/1992 | Sekine et al. | 358/80 |

Primary Examiner—Jose L. Couso

[57] ABSTRACT

A system and method for finding areas of similar color in electronically captured spot color images and replacing the similar colors with a single dominant color. An original image is first prescanned at low resolution to generate an electronic image. Using information from the prescan step, the system classifies colors in the generated image using a three dimensional histogram. A pallet of dominant colors is identified based on the histogram classification. Each line of the original image is then scanned at a second resolution, the second resolution being substantially higher than the first resolution. The scanned lines are then processed to determine where within each line different colors exist. The locations of the different colors are noted using a break out box comprising a set of rules to evaluate each pixel. Segments of each line are correlated with each other and with segments of adjacent lines to determine if the noted colors are in similar locations to thereby identify various spatial areas of color representing the original. The spatial areas are finally compared with the pallet of colors and the average noted color of the spatial areas are replaced with the closest corresponding pallet color.

15 Claims, 21 Drawing Sheets

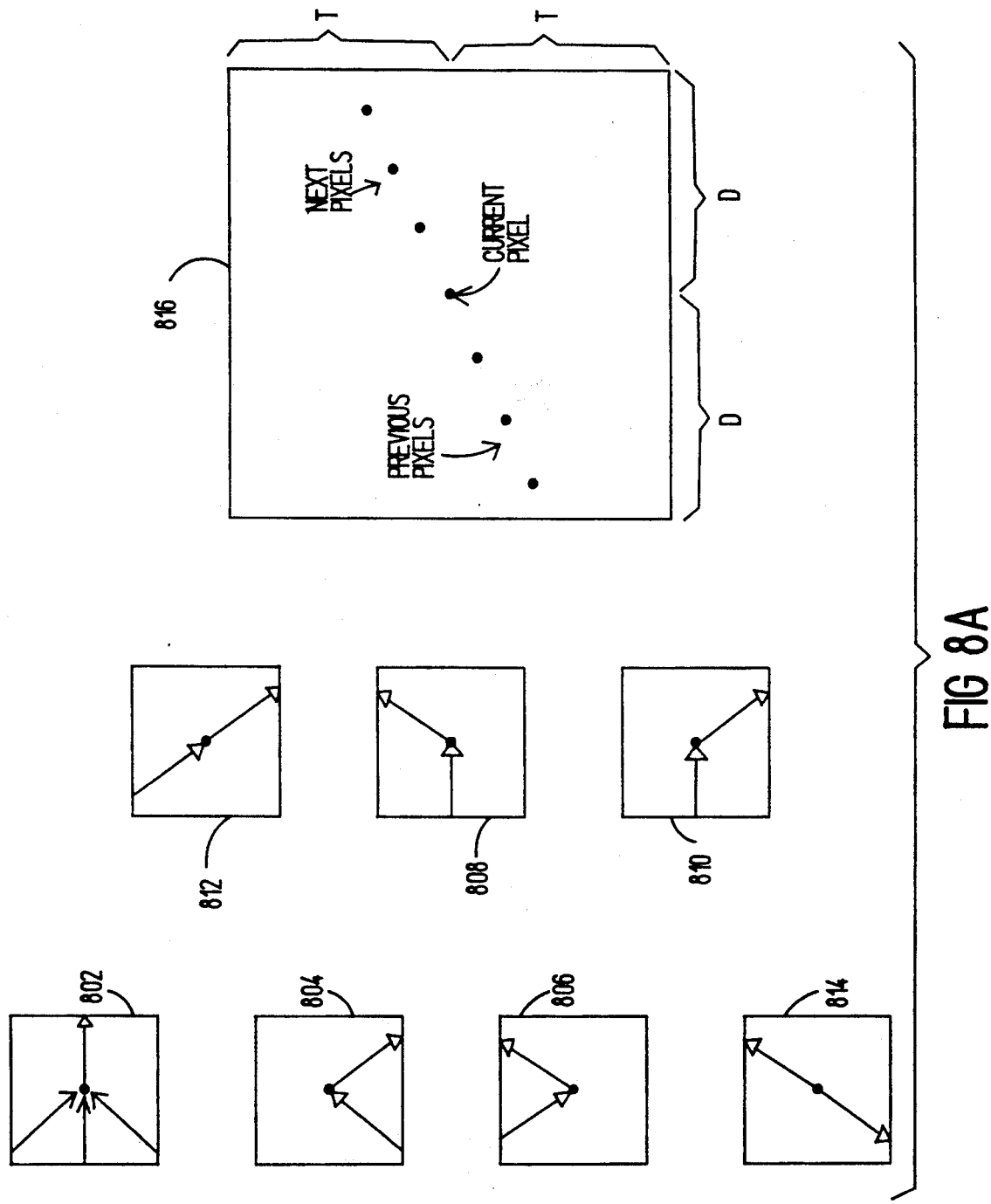

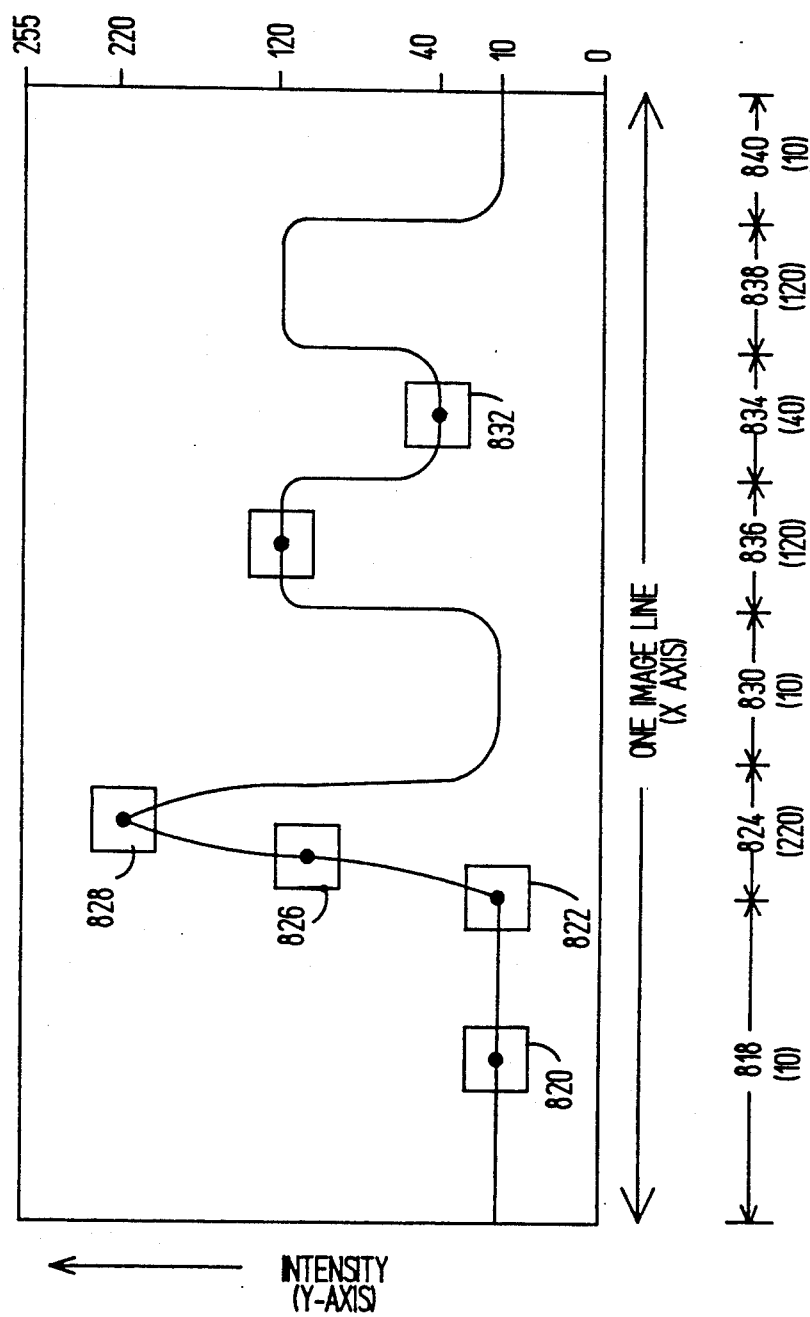

SYSTEM AND METHOD FOR SPOT COLOR EXTRACTION

DESCRIPTION

1. Technical Field

The field of the invention relates to color image processing and in particular to a system and method for finding area of similar color in electronically captured spot color images and replacing the similar colors with a single dominant color.

2. Background Art

Several current computer desktop publishing and image processing systems permit users to create and/or modify synthetic graphical images and text. In the latter case, the image is retrieved directly form memory to a display device for the user to view the image and perform image processing routines that are supported by the system. Prior to being able to retrieve the image from memory, however, the image must be scanned using an image scanning device (scanner). Image scanners convert an original image, from a document for instance, into raster format of a predetermined resolution in dots per inch (dpi).

Any scanner, or almost any electronic device that captures image data will take in an image as either a greyscale value from 0 to 255, or a color value typically split into red, green and blue (RGB), with the intensity of each color being represented by some numeric range from 0 to 255, for example. Images represented in this way are called usually continuous tone or "contone" images.

Contone therefore refers any process that assigns a range of values to each pixel. A greyscale image is a contone image, because it contains a range of values from 0 to 255, in the most common case. An RGB image is typically contone because each of the colors is represented by a range from 0 to 255.

Black and white contone is the simplest case; for greyscale, 0 is full black, and 255 is full white. Color contone is more complicated, but the same principal holds: each color is assigned 3 bytes, each byte represents R, G, or B and the magnitude of corresponding byte represents the intensity of that color.

A contone image can be thresholded using a simple threshold method. A simple threshold method will translate a greyscale value above 128 to white, and a value below 127 to black. Thresholding for color images to produce a color image is somewhat different.

Color thresholding is more commonly called "posterization". Posterization is a technique for extracting a pallet image from a true color image. A true color image, is an image that contains components of red, green and blue. Typically, there are also other color spaces, but red, green and blue is the most common. As discussed above, each RGB color has a value between 0 and 255 associated with it.

In this case, the image would actually have three bytes of information, (e.g., three bit components). One being red, one being green, and one being blue. Each pixel would have those three bytes associated with it to describe the color represented by that pixel. Alternatively, a pallet image would have one pallet index per pixel. The pallet index is an index into a pallet of values for red, blue and green.

The process of posterization is basically one of taking that true color image and converting it to the closest match in a pallet by substituting the RGB pixel with the pixel in the pallet, or in the case of converting it to a pallet image, to replace it in the index. The true color image is then converted to a color image that is made up of indexes into a pallet (a pallet image). Posterization is therefore the process of just mapping RGB colors into that pallet, and the resulting image will then have only those colors in it.

A "spot color" image, in its purest form, is an image that has been printed by an offset printing press where each color in that image is reproduced by a separate print roll and ink. Each color is unique and is solid. The final image is comprised solely of spots of color. Consider a spot color image including six colors, orange, yellow, green, red, blue and black; each being solid and printed on a card stock. In order to produce this original image, it would have been run through six separate presses, each one laying down one or more solid areas of a specific color.

This is different from a conventional "half-toning" process that is used to produce contone images, or photo-like images for magazines and books. Half-tone images are produced using four presses; one each running cyan, yellow, magenta and black, respectively. Such a system permits creating images with color combinations by doing half-toning with those various colors. But the colors are not solid, because they contain patterns in them. Thus, the half-toning process is not a spot color process.

Consider a photographic image reproduced using a half-toning process. Looking closely at the half-toned image one will see that it is actually made up of a series of pattern of dots. Basically, the dots will vary in size in order to try and represent a photographic type image. It is actually at a much coarser level then the original photograph. Black and white half-toned images do the same thing by varying the number of molecules that are converted to a certain color. Black and white half-toned images look very smooth, so do color half-toned images. It is because they have very fine granularity. On an offset press, the grain is larger. Looking at a newspaper, the grain is poor and one can actually see the patterning very clearly. The patterning being a regular grid of dots, and the dots varying in size to represent different intensities, which gives the photographic term, half-tone.

When a spot color image is scanned and input to a computer, the resulting colors actually comprise a variety of colors. This loss of true color is the result of noise in the system: from the inconsistency of the printing process and the scanner itself. There may be a great deal of variance in each of the color components. For instance, in an RGB scanner, the change over a range of from 0 to 255 maybe $\pm 10$. At worse case, if each color shades to 20 variants, $20 \times 20 \times 20$, or 8,000 different digital color shades may look like one single color to the naked eye.

Users commonly load a scanned spot image into a paint package or presentation package to edit it or change colors. The scanned image as it appears on the CRT may still look like a spot color. However, the scanned spot image will inevitably include many undetectable shades of color. Several commercially available packages include functions to change colors that appear on the screen.

For example, the paint bucket tools which are common in Macintosh ® print packages. The user may try to fill a particular spot color object with a new color.

Because there may actually be 8000 different colors, using the fill function may yield no noticeable result. Thus, short of editing every single color variation, the object cannot be edited. PC Paintbrush ® is a product available for IBM-based systems and Deskpaint is a paint package available from Zedcor Inc. which operates on the Macintosh, both packages support the paint-bucket fill feature. In addition, Deskpaint is more sophisticated in that it allows the user to fill a certain range of colors. However, it is not effective because the range is very difficult to control and the image becomes distorted due to problems in the transitions between colors.

There are images that are half-tone and images that are photographs that users perceive as being spot color. On the color side, there are color drawings which would be the equivalent of spot color, images that are actually produced on separate runs and others that are produced with half-tones of colors. Color half-tones would be created with a half-tone process on the press, usually intended for contone, but color drawings are often rendered with color half-tones. Finally, there is the color photograph.

On the other hand, a synthetic image is one which has been created typically by a computer. There are generally three ways of creating an image. One would be nature, like taking a picture of a person or a mountain. This is a real-life image. It is usually a contone image. The next source would be a hand-created image, hand drawings and paintings, for example. Typically, some of these can be synthetic images or considered to be synthetic. The third class would be a computer-generated image or another type of mechanically generated image.

The number of different colors that are in an image goes down considerably from real life, which includes a very large number of real color variations, to a synthetically generated image in which the number of colors is significantly reduced. The number of real colors will rarely be above ten in a synthetic image. Usually a synthetic image would include four or five colors.

Consider, for example, a synthetic image of a 3-D house generated by a computer. One immediately notices that it has very flat and solid walls with very little texturing. Also, there is no noise in it, which is one of the things that gives life and the feeling of reality to natural images. Objects in the real world are not truly smooth. Objects that are synthetically generated are typically very flat and smooth.

DISCLOSURE OF THE INVENTION

The system and method of the present invention (the present invention) are for finding area of similar color in electronically captured spot color images and replacing the similar colors with a single dominant color.

In conjunction with present invention an original image is first scanned at low resolution to generate an electronic image. This step is called the prescan step. Using information from the prescan step, the system classifies colors in the generated image using a three dimensional (3-D) histogram. The dimensions of the histogram are the red, blue and green (RGB) colors of the scanner. However, the dimensions of the histogram may comprise other known image coordinate systems. A pallet of dominant colors is identified based on the histogram classification. The color pallet is used to identify the dominant colors in the image.

Each line of the original image is scanned at a second resolution, the second resolution being substantially higher than the first resolution. The scanned lines are then processed to determine where within each line different colors exist. The locations of the different colors are noted (e.g., stored in memory), using a break out box comprising a set of rules to evaluate each pixel.

Segments of each line are correlated with each other and with segments of adjacent lines to determine if the noted colors are in similar locations to thereby identify various spatial areas of color representing the original. The spatial areas are finally compared with the pallet of colors and the average noted color of the spatial areas are replaced with the closest corresponding pallet color.

BRIEF DESCRIPTION OF DRAWINGS

The invention will be better understood if reference is made to the accompanying drawings in which:

FIGS. 8A and B show features of the break out box in conjunction with the present invention;

BEST MODE FOR CARRYING OUT THE INVENTION

In conjunction with the present invention images are processed on a line-by-line basis. Each line has some number of pixels horizontally which are referred to as the width. The number of lines are referred to as the height. The width and the height in pixels (or the number of pixels horizontally and the number of lines) describe the dimensions of the image in pixels.

In the horizontal direction, the width in bytes is also kept track of, the idea being that the image can fully be described given the number of pixels horizontally, the number of lines, the width and bytes of the image.

There are several different types of images that are used by the present invention. Black and white images can be processed and output as one bit per pixel, based on greyscale images input as 8-bit words, i.e., one pixel per byte.

In addition the system processes 2 RGB data formats. One is 24-bit where there is a red, a green, and a blue byte. The other one is 32-bit where there is an alpha byte, a red, a green, and a blue. The alpha byte is actually unused. The 32-bit scheme is convention on the Macintosh ®, and permits loading and storage of RGB pixels as one 32-bit integer to speed-up processing. These type of data are processes and output as pallet images. A pallet image comprises an 8-bit per pixel image, thus, each byte represents one pixel. As discussed above, each 8-bit word is an index into a pallet of colors.

Figure 1:
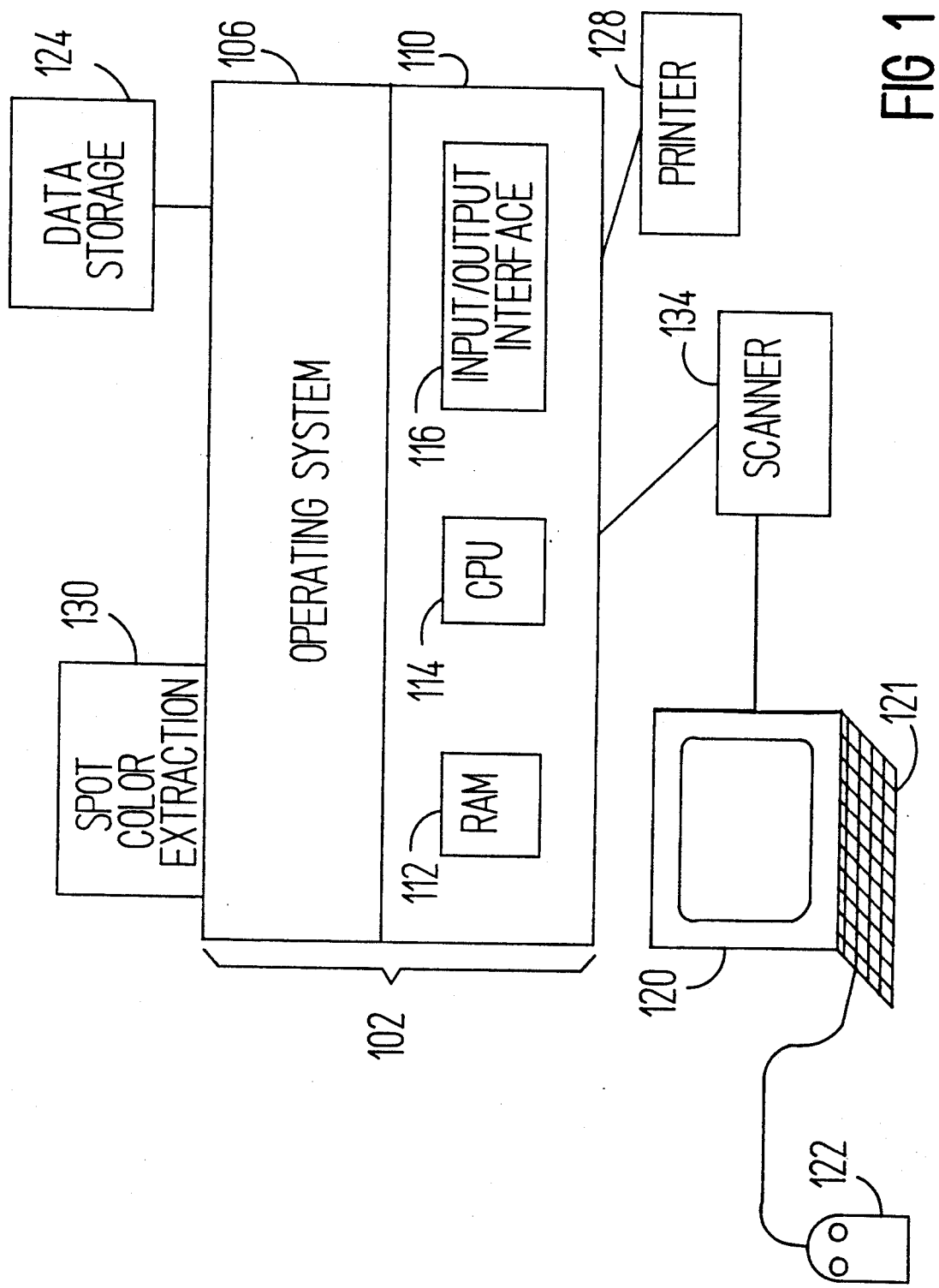
FIG. 1 shows a high level diagram of a hardware system to implement the present invention.

An example of hardware system for implementing the present spot color extraction invention is shown in FIG. 1. The computer platform 102 includes hardware units 110, including a central processing unit (CPU) 114, a random access memory (RAM) 112, and an input/output interface 116. The RAM 112 is also called a main memory.

The present invention is depicted as a process 130 for spot color extraction of images scanned by a scanner 134 and stored on a data storage device 124. The data storage device 124 is also called a secondary storage and may include hard disks and tape drives. The data storage device 124 represents non-volatile storage.

The present spot color extraction invention may be implemented in software or directly in hardware. The present invention could also be implemented in a combination of software and hardware, by optimizing specific functions in hardware to increase efficiency of the overall system.

The computer includes as a display 120, a keyboard 121, a mouse 122 and a printing device 128. Users 132 interact with the computer and the spot color extraction process 130 via the display 120, the keyboard 121, and the mouse 122.

Examples of systems that support the present invention include the Macintosh ® Model II, SE and Plus personal computers families, as well as most IBM PC compatible 286, 386 and 486 models, and their equivalents.

Figure 2:
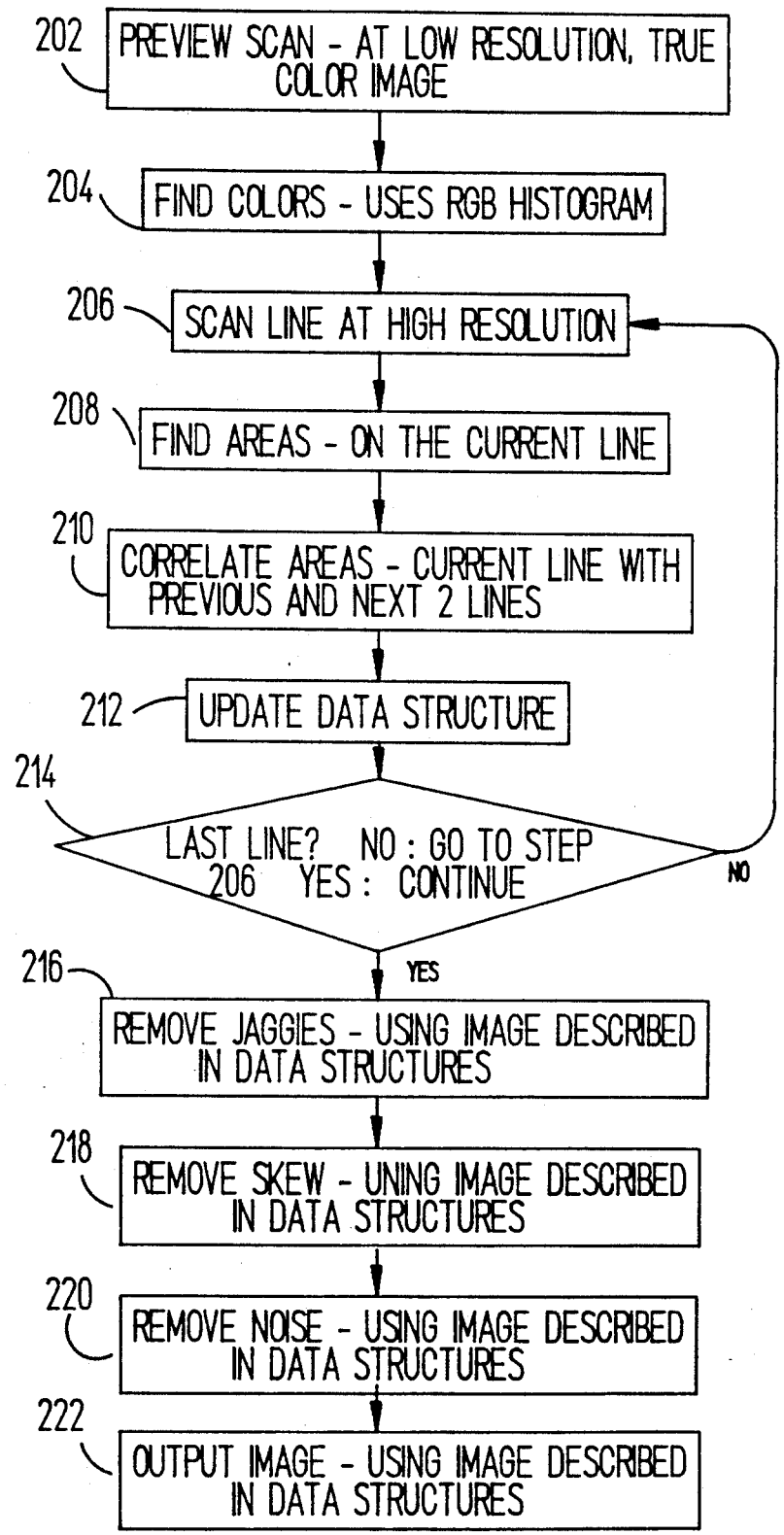
FIG. 2 shows a high level flow chart of spot color extraction in conjunction with the present invention.

A high level overview of the present invention will now be discussed with reference to FIG. 2. A preview scan 202 is performed to obtain a low-resolution image of the original to be spot color extracted. This image is 8-bit greyscale or 24-bit true color.

Using the information from the preview scan 202 the system and method of the present invention find a pallet of colors using a 3-D histogram (see step 204). Finding the dominant colors is accomplished by creating "clusters" of colors that are related. This is done by taking the maximum occurrence and finding the colors around that maximum occurrence that are related and including the related colors in the color cluster.

Next a high resolution scan of each line is obtained in 8-bit greyscale or 24-bit color, as shown at step 206. From this point the lines are processed individually so that the following step, step 208, can find areas on each current line that contain the same or similar colors, peak colors and color transitions.

The areas of the line identified in step 208 are correlated with each other and areas of adjacent lines, as shown in step 210.

A data structure is created and updated which will represent outlines of spot areas determined in the previous steps. (See step 212.) The system then determines whether additional lines must be processed, as shown in the conditional statement at step 214. At this point, if no more lines are to be processed, the system then prepares to output the spot color extracted image. If further lines are to be evaluated, the system jumps back to begin processing the additional line(s), as shown at step 206.

Three additional process steps are optionally carried out by the system, as shown at steps 216-220. Line "jaggies" are removed from the image described in the data structure, as shown at step 216. At step 218 skew anomalies are removed, and at step 220 noise is removed. The filtered or non-filtered spot color extracted image is then output, as shown at step 222.

The above steps of the spot color extraction system and method of the present invention will now be described separately in further detail.

The preview scan is a relatively straight forward and conventional step which permits the user to preview the entire image or portion of the image. The preview scan is performed at low resolution in 24-bit color or 8-bit greyscale at about 37 dpi. The preview scan generates an image the user can view on the screen. Using well known techniques, the user is permitted to select an area which he may want to perform the spot color extraction on. Alternatively, the entire prescanned spot image may be selected.

The dpi varies based on the size of the preview area and whether the user chooses a complete or partial high resolution scan of the previewed area. The low resolution scan may vary anywhere from 37 dpi, which is a good initial preview scan, up to the scanners maximum scan rate. As will be discussed below, the 3-D histogram will throw out a percentage of data to determine the pallet of colors; hence, a large dpi for the low resolution scan is unnecessary.

The software or hardware for implementing the preview scan is standard, and is typically provided to users by the scanner manufacturer, or second source vendors. Products such as Scanning Gallery 2.0, Scanning Gallery 5.0 for IBM-based machines and Deskscan 1.0 for the Macintosh ®. (These three packages are products of Hewlett-Packard Company, 700 71$^{st}$ Avenue, Greeley, CO 80634.) These and similar packages will permit the user to select image areas using a mouse and the cursor to create a selection box around the area to be scanned at high resolution.

Prior to discussing the 3-D color histogram, a 2-D gray-scale histogram will briefly be explained. A 2-D histogram includes one graph along the X-axis, for example, with values ranging from 0 to 255. These are the intensity of the greyscale values from black to white, respectively, along the X-axis. Along the Y-axis, would be the number of occurrences of each of those intensity values. For instance the plot of a greyscale image of a white page filled with black text would yield a 2-D histogram with a large clump near 0, representing the black text, and large clump near 255 representing the white background.

As another example, a 2-D histogram of a greyscale image photograph of some real life object would have a range of intensities spread over entire X-axis based on the content of that image. If it was a dark image, there would be more towards the black, and a lighter image would contain more occurrences be more towards the white end of the scale. The 2-D histogram of a complex image may look like a mountain range due to the many different shades of grey. Thus, the histogram charts the number of occurrences of each intensity level.

A 3-D color (RGB) histogram has three axes, red, green, and blue, respectively, each ranging in intensity for 0 to 255. Thus, at the origin (0,0,0), each of the three intensities are 0 and the corresponding color is black. At the far corner of the 3-D RGB histogram is the point (255,255,255), corresponding to the color white.

Figure 3A:
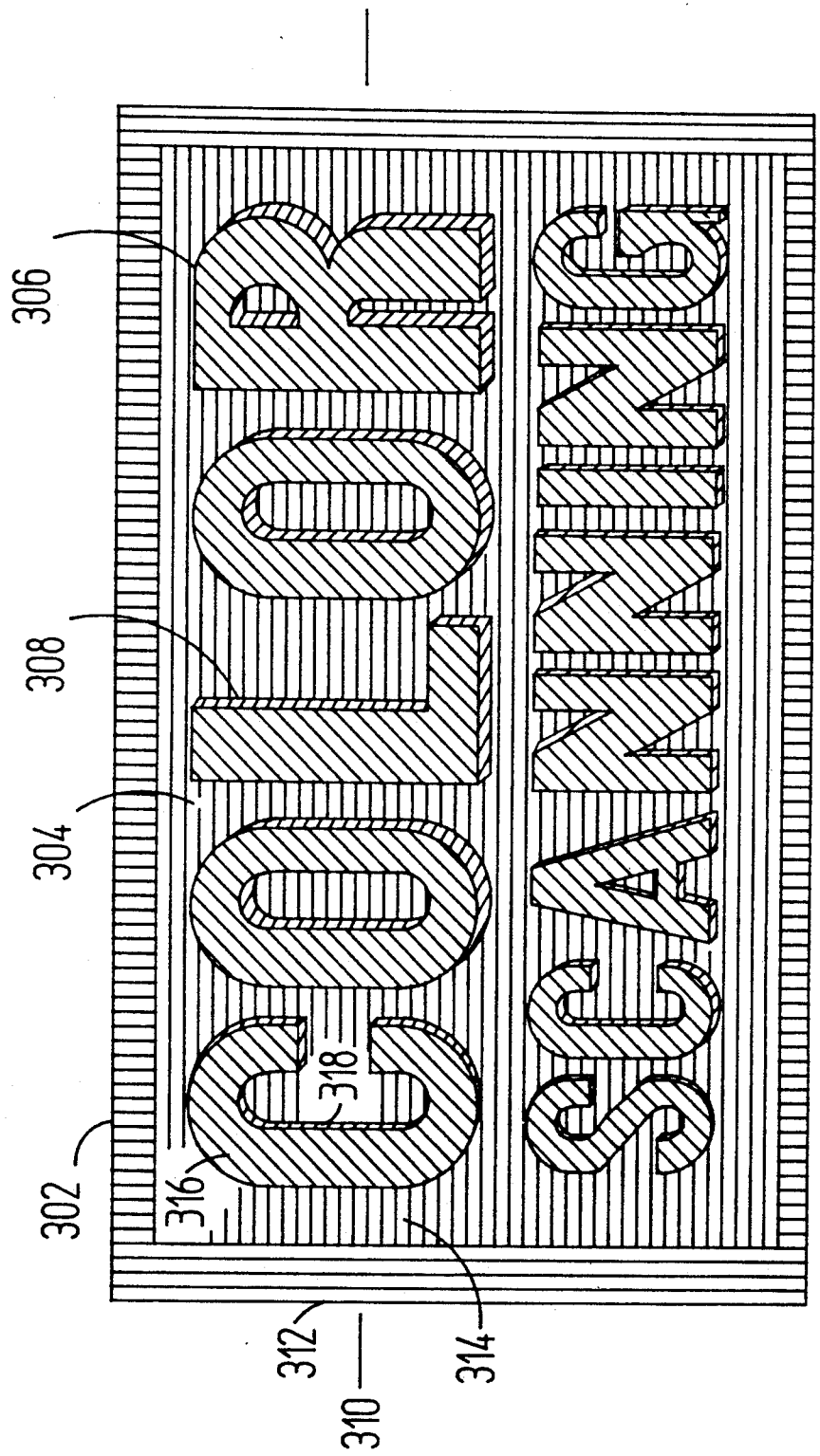
FIGS. 3A-D show a spot color image and three color profiles of the image.
Figure 3B:
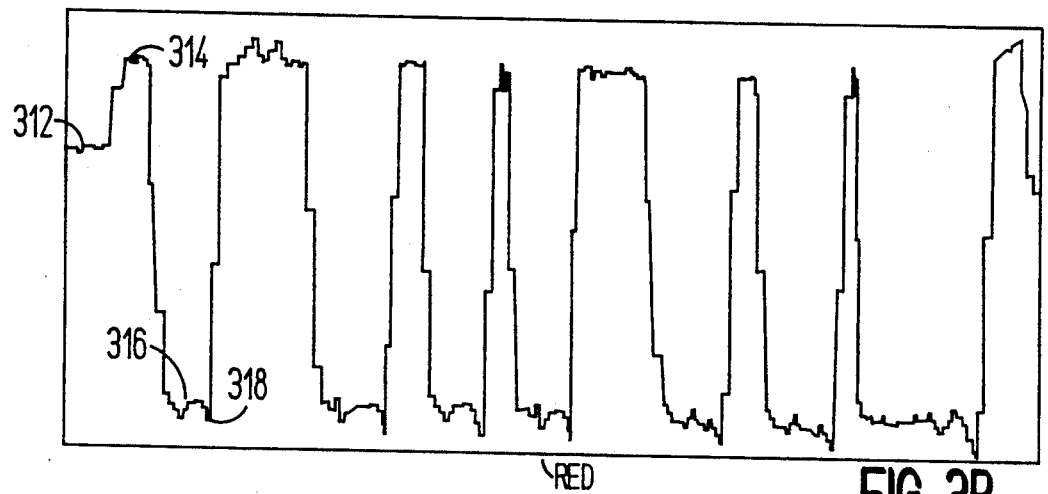
Figure 3C:
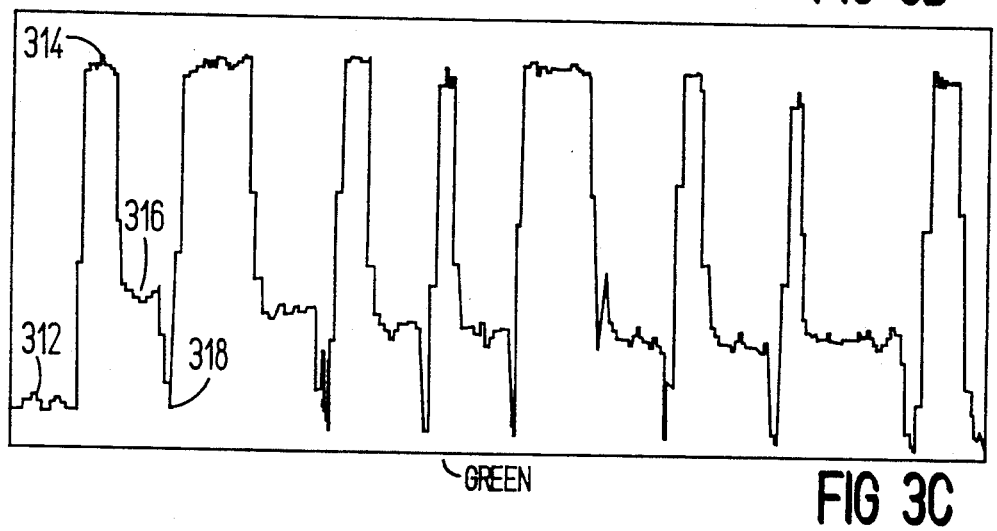
Figure 3D:
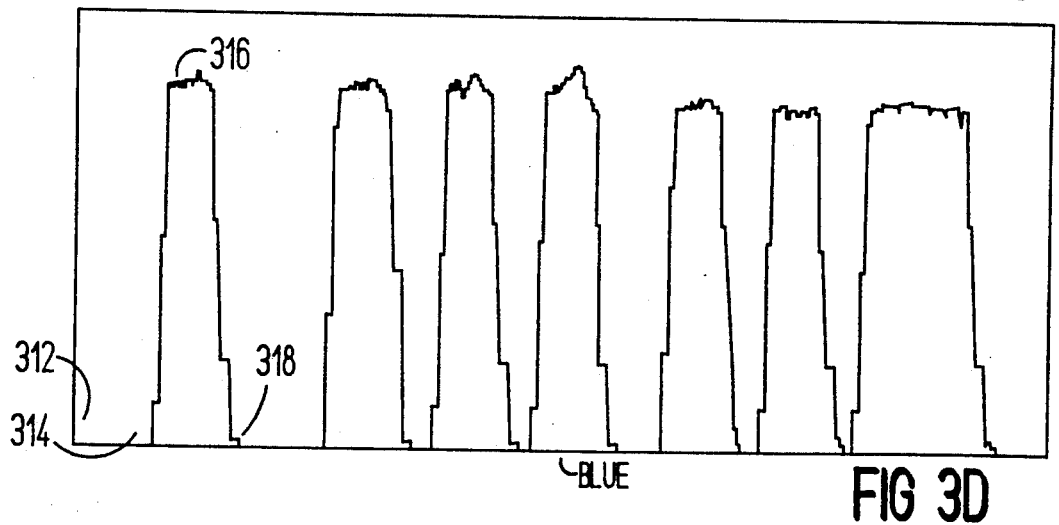

A black and white representation of an original spot color image is shown in FIG. 3A. The outside border 302 is red, the background 304 of the words "COLOR SCANNING" is yellow, the lettering 306 is blue and the letter shadowing 308 is black. The lines 310 indicate a slice taken through the image to show the color profiles of FIGS. 3B-3D. FIGS. 3B-D represent color profiles of the slice corresponding to the colors red, green and blue, respectively.

The color intensity of a border section 312 is also shown in FIGS. 3B-D at sections 314. Because the border section 312 is primarily red, the intensity of the red profile is high, the intensity of the green profile is very low, and the intensity of the blue profile is substantially zero. The color intensity of a background section 314 is also shown in FIGS. 3B-D at sections 314. Because the background section 314 is primarily yellow, the intensity of the red profile is high, the intensity of the green profile is high (i.e., red and green make yellow) and the intensity of the blue profile is substantially zero.

A section 316 of the letter "C" is shown in FIGS. 3B-D to have very little red, some green and a high level of blue.

Finally, a black border section 318 is also depicted in the three profiles. Each of the three color profiles indicate the black border section 318 has very little color intensity.

The remaining section of FIG. 3A is also shown in FIGS. 3B-D. Note that the color plateaus in these figures are jagged. This is due to the scanning process and the introduction of noise. Moreover, the original spot color image may have had various color variations.

Figure 4:
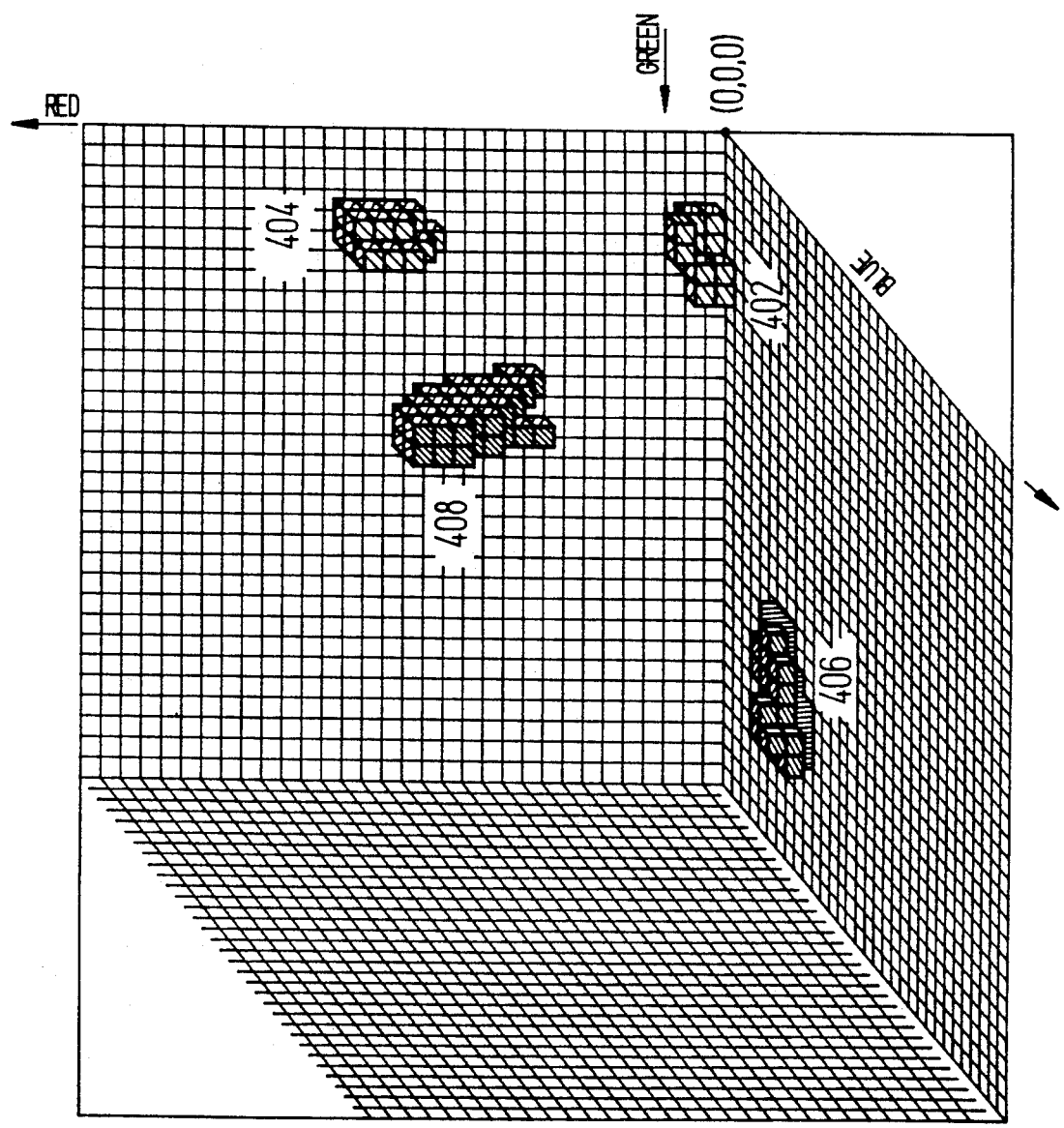
FIG. 4 shows a 3-D RGB histogram in conjunction with the present invention.
Figure 5A:
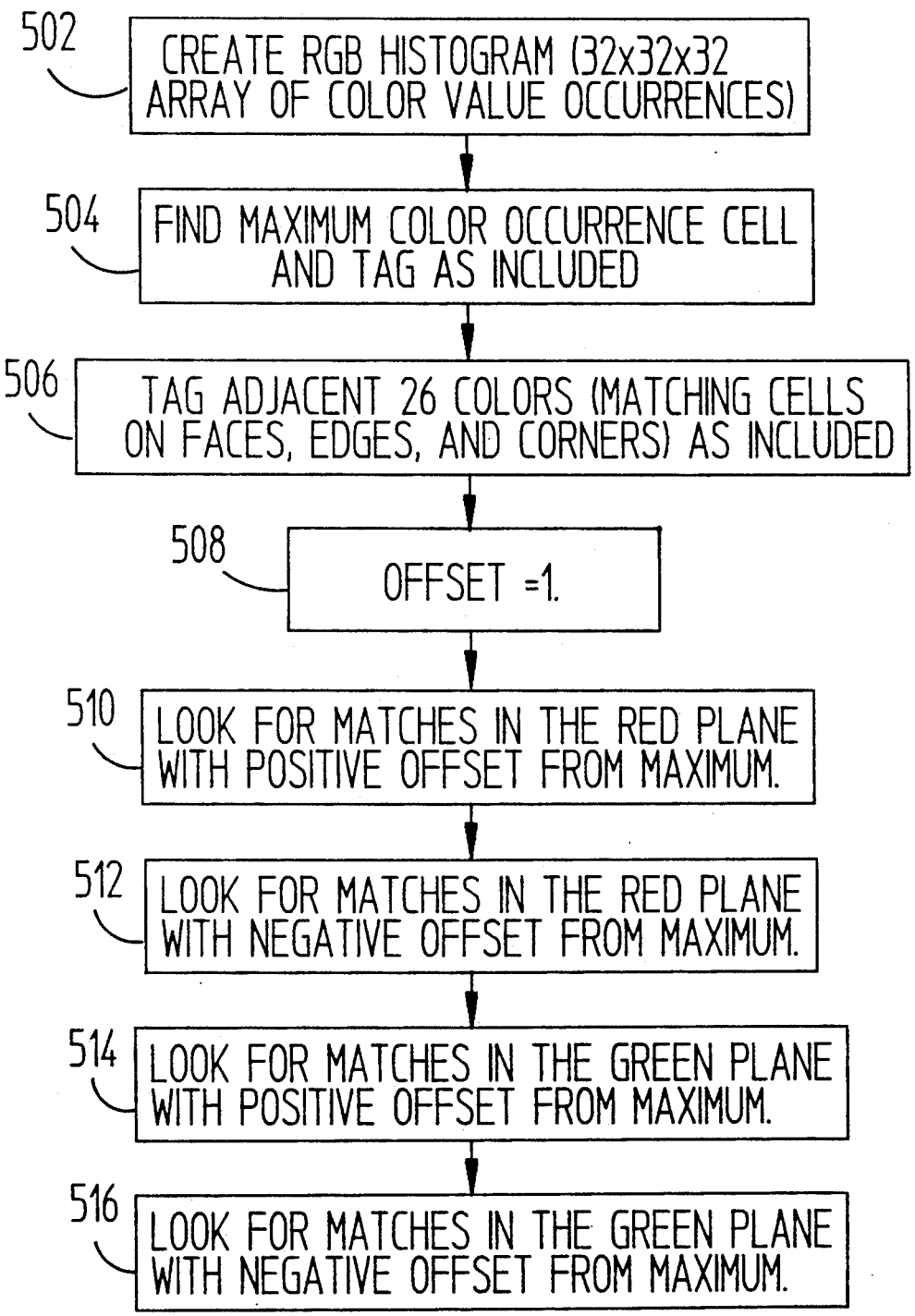
FIGS. 5A and B show flow charts depicting an operation to find colors in conjunction with the present invention.
Figure 5B:
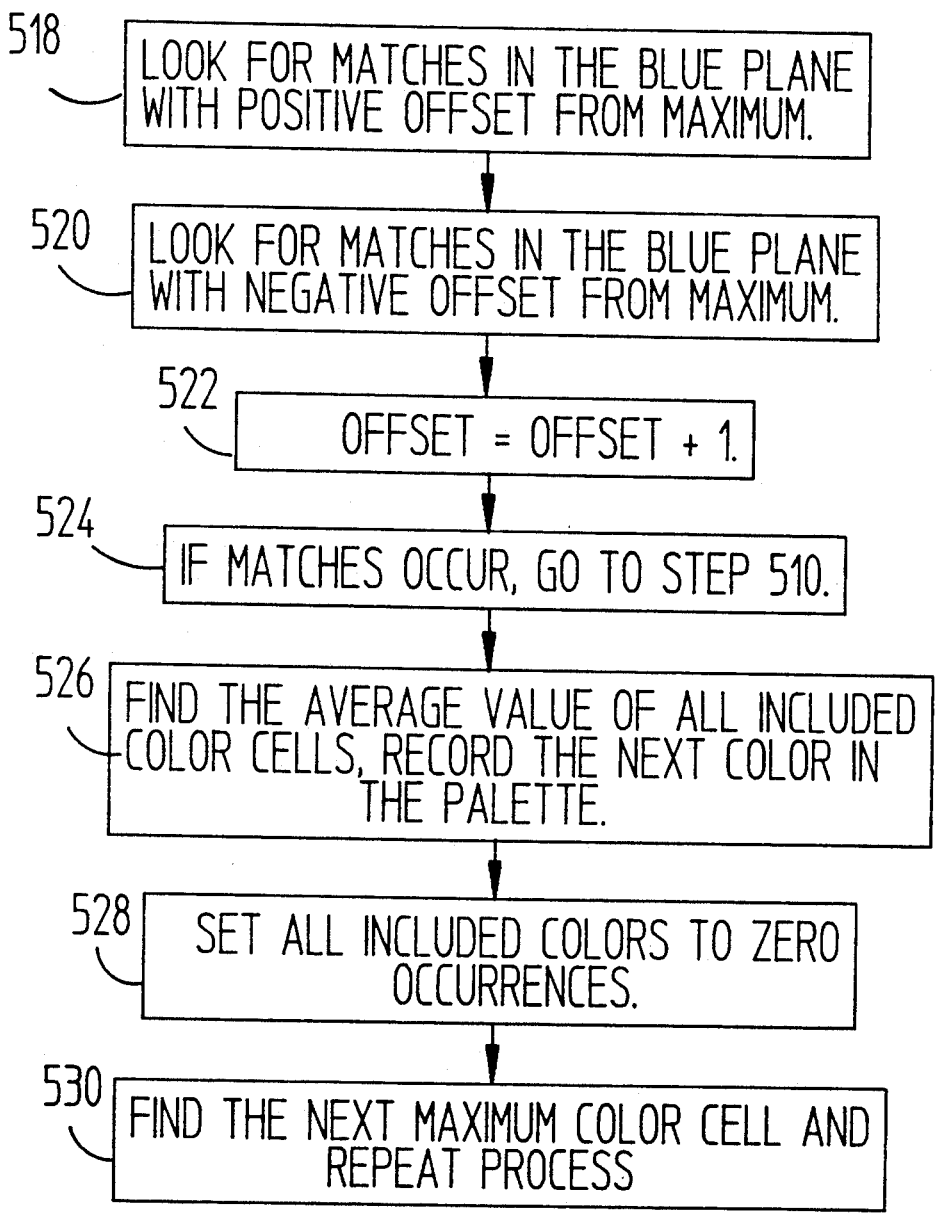

A 3-D RGB histogram of the original image in FIG. 3A is shown in FIG. 4 (also see step 502 of FIG. 5). The three color axes are label accordingly and are broken down into 32 increments. The origin (0,0,0) is on the right hand side of the figure. The "clouds" in FIG. 4 represented the number of occurrences of the four colors, black, red, blue, and yellow, of the cross section 310 of the original image in FIG. 3A. The cloud labeled 402 represents the occurrences and intensity of the black pixels from the original. The black cloud is positioned near the origin. The cloud labeled 404 represents the occurrences and intensity of the red pixels in the original. The red cloud 404 is positioned adjacent the red axis. The cloud labeled 406 represents the occurrences and intensity of the blue pixels in the original, and is positioned adjacent the blue axis. The cloud labeled 408 represents the occupancies and intensity of the yellow pixels in the original. The yellow cloud 408 is positioned in the foreground of the 4-D cube and adjacent the plane formed between the red and green axes.

The black, red and blue clouds are difficult to see in the 2-D representation of a 3-D figure, but they do have dimension as does the yellow cloud. The colors in each cloud are actually concentrated in the middle of the cloud. The outer sections of the clouds are lighted in color, which indicates that the number of occurrences of these outer shades are lower. The center of each cloud has a section of maximum occurrences. Note that all spatial information is lost by the histogram, because it only represents the occurrence of the pixels having a specific color.

The next task is to find the center of each cloud. This will represent the actual color that was to be represent by the corresponding spot color.

The three least significant bits are ignored and the histogram becomes 5-bit color, 0-31 on each side, with 32,768 total entries. Each one of entries is referred to as a "cell". Each cell represents 64 values in the original RGB space. In the search to identify the shades relating to a particular maximum occurrence, if the number of occurrences goes down, then the cells are included until there are less than 10 occurrences in a cell.

Conceptually, if the histogram has a peak, then a valley and another peak, the peak has a maximum number of values. As the topography is traversed, the cells will have lesser and lesser values in them until the bottom of the valley is reached. Then the search starts to go up the next slope, and the number of occurrences will go up. The search in that direction then stops, and all cells down until the valley are included. Going up again indicates that the search reaches another color cloud.

Figure 6A:
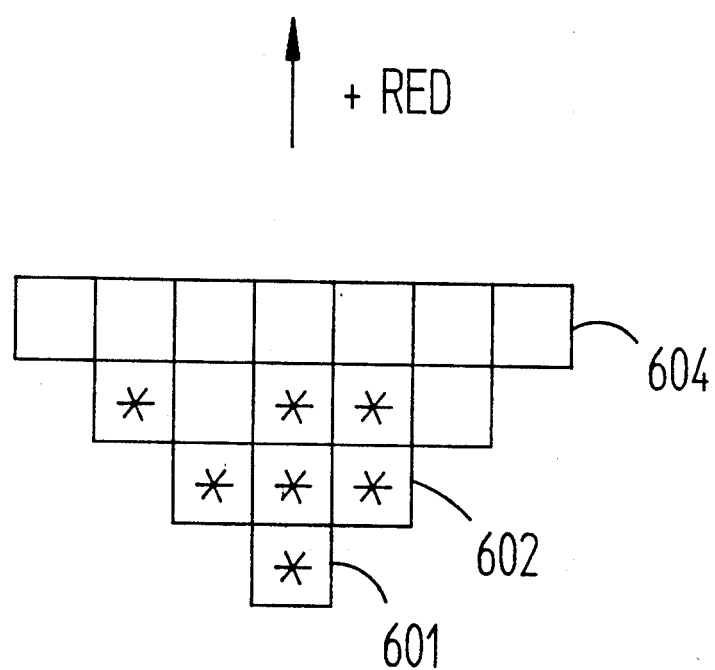
FIGS. 6A and B show a color cloud in conjunction with the present invention.
Figure 6B:
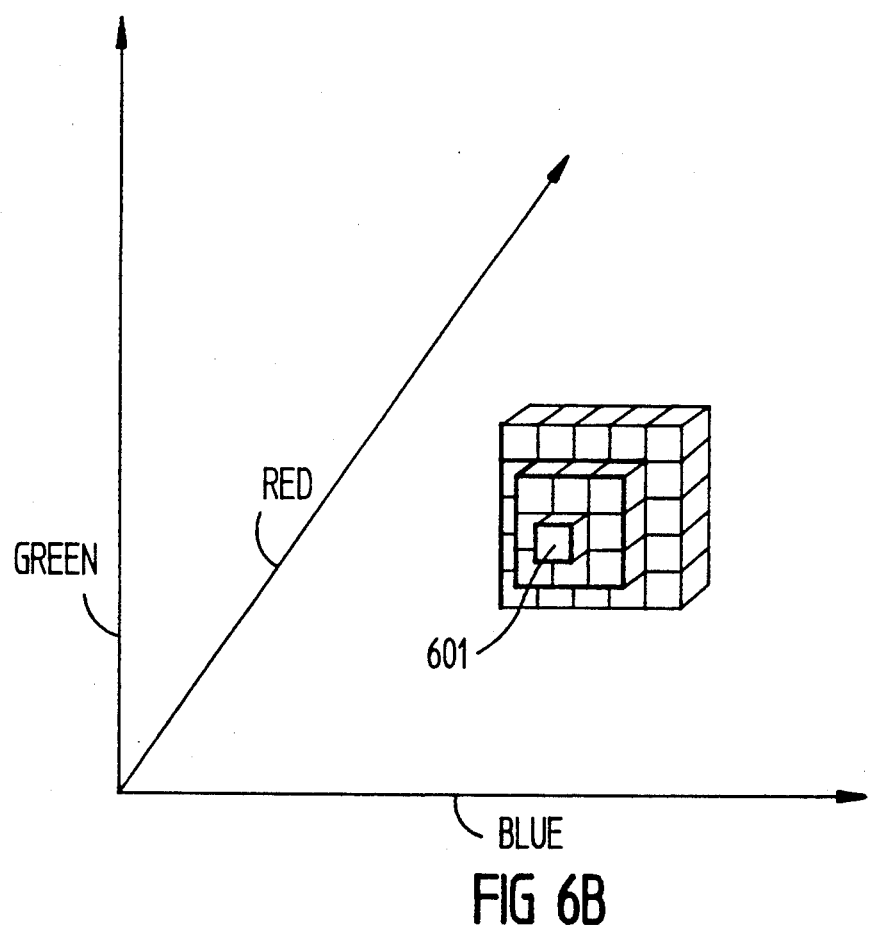

The system first looks for the cell with the maximum number of occurrences, see step 504 in FIG. 5. A cell 602 with a maximum number of occurrences is shown in FIGS. 6A and B. All adjacent cells with similar colors must now be determined.

Each cell has six immediate neighbors (six sides per cell). Looking in each direction the system must determine whether or not to include cells with similar color and decreasing occurrences. FIGS. 6A and B represent a search in one of the six directions. The first plane of nine cells is automatically included in the search and is tagged as being a similar color. The figures show a search in the positive red direction. As shown at 602 in FIG. 6A, the adjacent plane is included. Therefore, in the six directions a total of 26 cells would be automatically included. See step 506 in FIG. 5. The asterisks in the cells indicate those cells that have a decreasing number of occurrences and have therefore been tagged.

An offset is used for moving from plane to plane. An offset of one is a plane 602 adjacent to the maximum cell 601. An offset of two would be the next plane 604 in that direction, and so forth. Thus, the offset represents how far from the maximum cell the slices are searched through the RGB histogram.

An offset cut-off is also included. The offset cutoff in any one direction is six planes away from the maximum cell. The maximum number of cells in a cluster would therefore be 12×12×12. The cutoff may be user defined. Typically, in an RGB histogram the number of occurrences in the search decreases very rapidly and a cut-off is not necessary, or rarely reached.

An offset is incremented, as shown at 508, and the next plane in the positive red direction is evaluated, as shown at 510. Then the red plane in the opposite direction is evaluated, as shown at step 512. This process continues for the green and blue planes (i.e., both positive and negative directions are searched). See steps 514–520. The offset is then incremented (see 522) for evaluating the next set of planes. At step 524 the system stops searching if no further matches occur (e.g., the number of occurrences is less than 10 or it increases).

Once the cells in the cloud are resolved, the average color for that cloud is determined using color averaging techniques well known to those of ordinary skill in the art. The result is then recorded in a pallet of colors representing the colors most likely to have been the original spot color of the image. See step 526 in FIG. 5B.

After the first cloud's color is recorded in the pallet, all the cells corresponding to the cloud are zeroed, as shown in step 528. The next maximum cell is found and the cells adjacent to that cell are evaluated according to the method outlined above. See step 530. The process continues until all spot colors are extracted.

A high resolution scan is performed next. The high resolution scan is similar to the preview scan except only one scan line of information is processed at a time to conserve memory space. Again, 24-bit true color or 8-bit greyscale data is obtained at between 100–400 dpi, for example.

Each line is optionally color filtered (i.e., averaged) to smooth out the data. If the image is below 75 dpi there is no need for filtering. If the lines are scanned at between 75–150 dpi, every 3 pixels are averaged. Between 150–300 dpi, every 5 pixels are averaged. For instance, for 100 dpi, using the scanned data set, the first through third pixels are averaged to get an average value of the second pixel. The second through fourth pixels are averaged to yield an average value for the third pixel. The original data set are used for the averaging and the new values are stored in a new data set. This averaging may be done on a per color basis by separating each of the R, G and B elements. This process is shown in steps 702–704 of FIG. 7.

Figure 7:
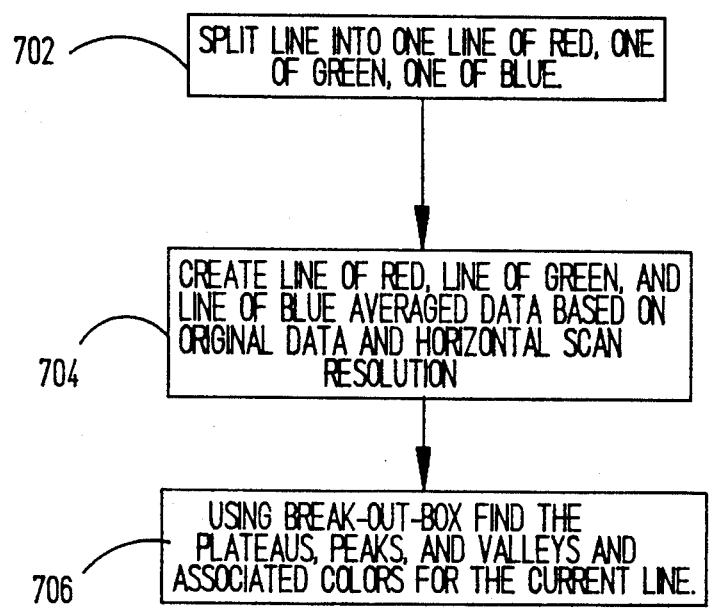
FIG. 7 shows a flow chart depicting an operation to find color areas in conjunction with the present invention.

The color areas in each line are located using what is called a "break out box", see step 706 of FIG. 7. The function of the break out box is described with reference to FIGS. 8A and B.

The break out box can identify seven pixel states, as shown in FIG. 8A. A plateau 802 is detected if, while the box traverses from one pixel to the next the pixel exits the box through a side. If the pixel enters and exits the box through the bottom, a peak intensity 804 is detected. A valley 806 is detected if the pixel enters and exits the box through the top. The beginning and end of a slope (808,810), as well as continuous slope (812,814) can also be detected.

The height of a break out box 816 represents an intensity tolerance T, and D represents the distance from the center to the back or front of the box measured in pixels. Thus, D and T represent the parameters of the break out box. T may be an intensity of 16, for example, and D may be set to 3 for 0–150 dpi or 4 for 151–1600 dpi.

FIG. 8B shows one color element of one image line. Color intensity is shown on the Y-axis and the width of the line in pixels is shown on the X-axis. The break out box is a fast and efficient method used to evaluate the intensity of each pixel and how the intensity changes along the line. This information is used to determine and store color areas of the line.

A plateau 818 is detected as shown at box 820. The intensity of the plateau is determined to be about 10, and its beginning and end pixels are shown along the X-axis. A box 822 represents the change of slope between the plateau 819 and a peak 824. An increasing slope is then detected, as shown at a box 826. The maximum value of the peak 824 is detected by a box 828. The intensity value 220 is stored for the peak 824. A second plateau is shown at 830. At a box 832 a valley 834 is recorded. The valley 834 is bounded by two plateaus 836 and 838. The line terminates at the end of a plateau 840.

Each plateau, peak and valley, is described by a start and an end point, and a color. The color for a peak is the maximum color value; for a valley it is the minimum; for the plateau it is the average from the start to the end of the area.

Figure 9:
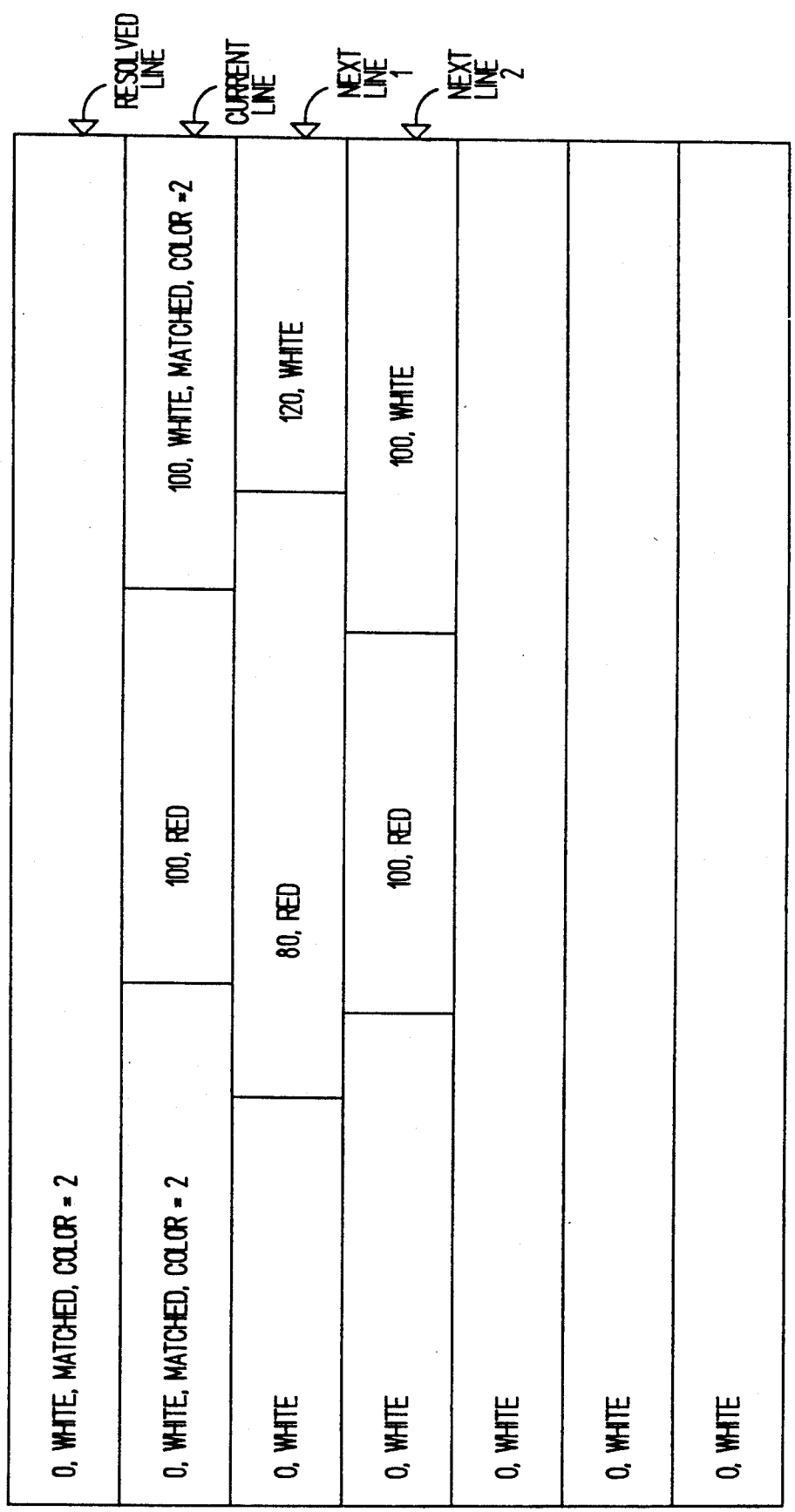
FIG. 9 shows an area matching FIFO in conjunction with the present invention.
Figure 10:
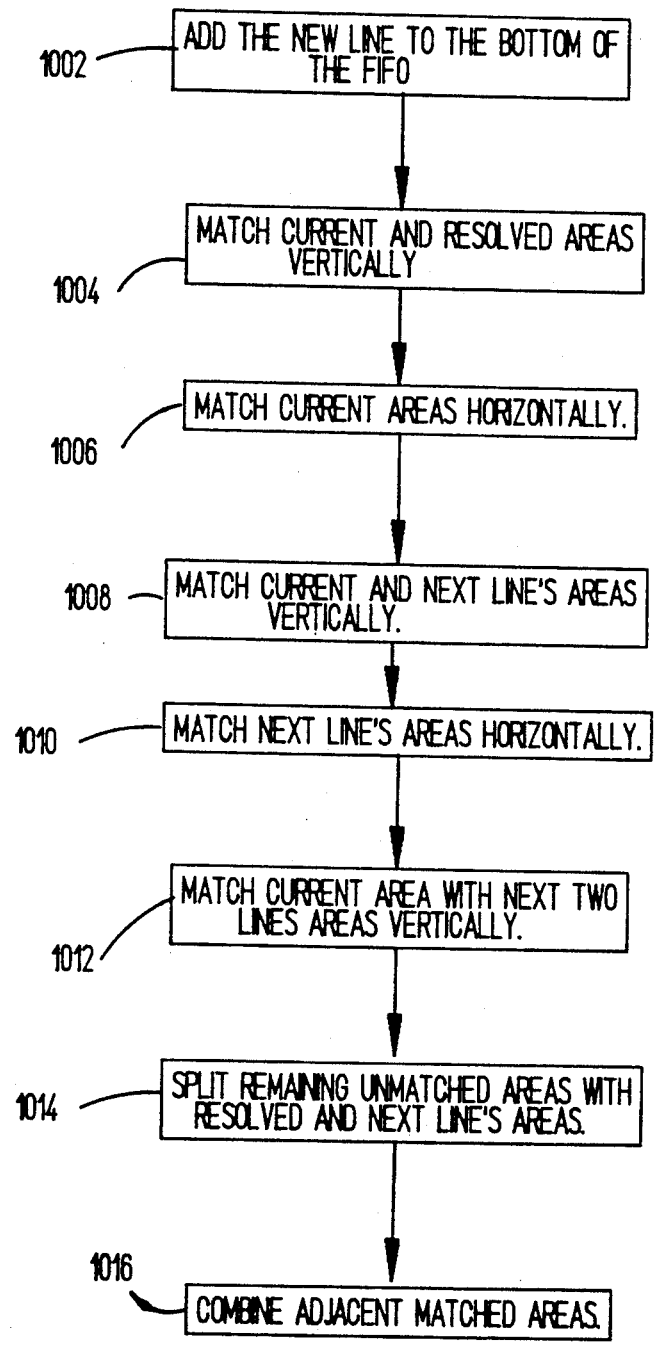
FIG. 10 shows a flow chart depicting an operation for correlating color areas in conjunction with the present invention.

Correlating the areas of color is then performed by a method shown and described in FIGS. 9 and 10, respectively.

FIG. 9 shows first-in-first-out (FIFO) buffer for matching color areas. The FIFO contains 7 lines, but not all lines are required. There is one entry into the FIFO for each line. The FIFO is implemented as an array of pointers to a list of data structures. The structures define the line color areas. Each structure comprises a color, the beginning of the color (because the next color start defines the end of the previous one), a flag to indicate whether the area is matched with another area, and an index into the color pallet. The maximum number of areas that could be defined by a line is set at a limit of 256, for example.

The line that is in the top of the FIFO is referred to as the resolved line. The second line in the FIFO is the current line being processed. The next line, and the one after that are used for the matching process. The system and method are optimized for four lines in the FIFO, but this number may be varied to match system speed and efficiency goals. The process begins by adding a new line to the FIFO, see step 1002.

FIG. 9 represents the lines corresponding to a red spot in the middle of a white page. The resolved line contains only one area, which is all white. Its starting position is zero. There are no other areas in the resolved line, so the end of it will be the end of the image. Process continues to the current line. The current line has one area that is white and starts at 0. A second area that is red and starts at 100, and third area is white and starts at 200.

The current line is evaluated from left to right, and each area is compared to an adjacent area in the resolved line. The color of the first white area in the current line is vertically compared to the color in the resolved line, because the resolved line only has one area. See step 1004. If the color is within the tolerance T of the pallet color of the resolved line, the first white area in the current line is flagged "matched", and process continues to the red area of the current line.

The system first attempts to vertically match the red area, then the system tries to match horizontally. See step 1006. However, because there is no previously matched red area to match it to, this area is flagged "unmatched". The system then attempts to vertically match the next line with the current line. See step 1008. All the horizontal matching for the next line is then executed. See step 1010. Next, the system looks for any areas that have not been matched. It then checks if the unmatched areas will match up with areas on the next two lines. See step 1012.

In some instances, an area of the current line may not match with an area below it. Such areas are transient or false color. Rather than keeping the area and assigning it an appropriate pallet color, the system checks whether a line above it or below it is matched. If the line below it is not matched, the area is mapped to the above area. If the line below it is matched, a determination is made as to which area its color is most similar. It is then mapped to the area with the closest color. See step 1014.

The system then combines all matched areas. Next, the average color of the combined areas is determined, using known methods. The average color is compared to the pallet colors and the closest color is set for each area. This process is shown in step 1016.

The method of the present invention for updating a data structure to keep track of the extracted spot colors will now be addressed.

Figure 11:
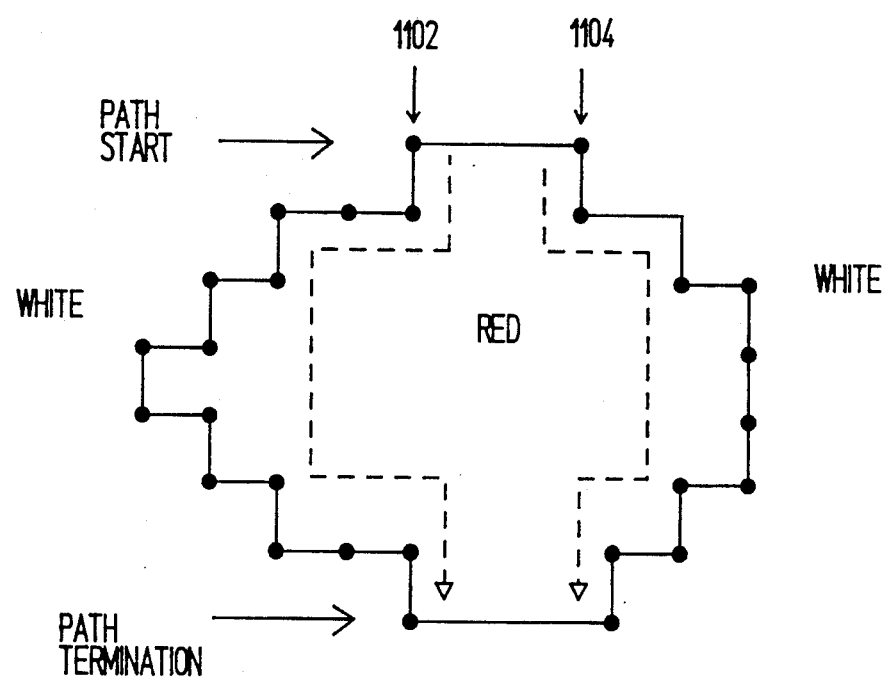
FIG. 11 shows the creation of color paths in conjunction with the present invention.

A somewhat more complex red dot on a white page is shown in FIG. 11. Two paths are defined for the red dot: a red path 1102 and a white path 1104.

To update the data structure, the information from the resolved lines must be converted into the path 1102 that follows the left hand side of the dot and the path 1104 that follows the right hand side. A data structure representing the edges has some significant advantages: specifically for doing the jaggy removal, as will be discussed below.

One of the main reasons for converting this data structure is to conserve systems memory. The present invention converts a spot color into a data structure that is much more compact than the original image; it can operate on it in a way that is much faster and then quickly output the image.

Figure 12:
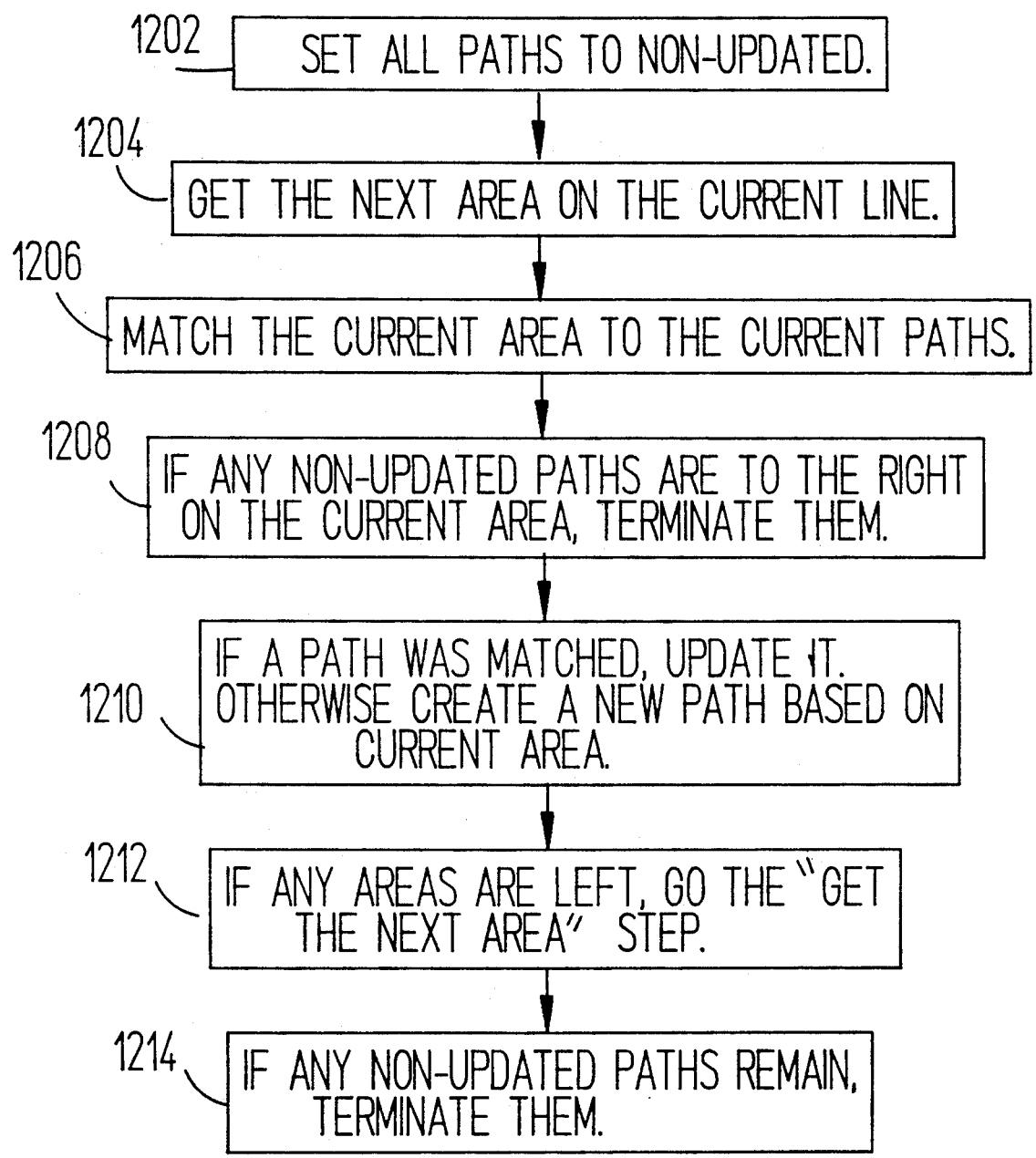
FIG. 12 shows a flow chart depicting an operation for updating data structures in conjunction with the present invention.

When a line is complete it is outputted from the FIFO, and either a new path is created or the current path(s) must be flagged so that they can be updated, as shown at step 1202 of FIG. 12. The first (or next) area from the FIFO line is obtained, see step 1204, and the system attempts to match that area to an existing path (see step 1206). To do this, the system checks if there is a path that starts and ends with an overlap to the new area.

Step 1208 shows the case in which the system will bypass a path. In such a case, a bypassed path indicates that the path has ended because there was no update. The non-updated path is then terminated. See step 1208. If the path has only one line once it is terminated, it is then eliminated altogether. The system removes horizontal jaggies automatically by removing paths that are determined to be only one pixel high.

Matched paths are then updated. If a path is not matched, or if there was no match on the previous line of the current set of paths, then the system will create a new path that represents that new area. See step 1210.

The data structure continues to be updated while there are areas in the line to assign paths. Thus, if areas still remain the system returns to step 1204, as shown in step 1212.

The five (5) entries that make up each element of the data structure are the flag, pallet color, vertical start position, number of lines and the horizontal position for each line.

A path can be: empty (e.g., just an unused data structure); possible (e.g., an attempt at a path, or just one line); real (e.g., a real path with mode than one line); or terminated (e.g., a completed path).

Prior to output of the spot color extracted image, additional processing may be done.

Figure 13:
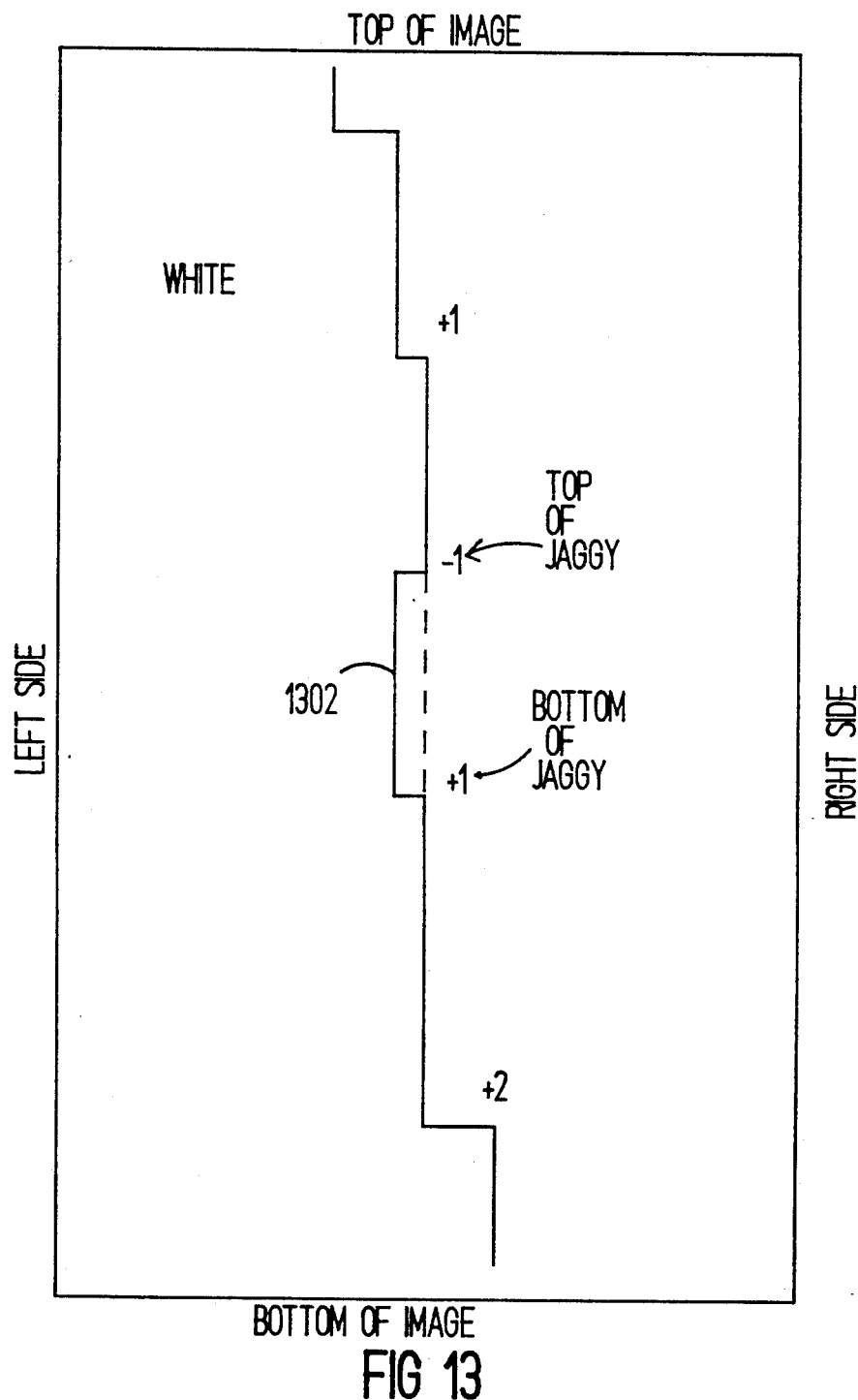
FIG. 13 shows vertical jaggy removal in conjunction with the present invention.

An example of a vertical jaggy is shown at 1302 of FIG. 13. This jaggy is typically an artifact created by the scanner. Jaggies on vertical lines are removed by looking for changes in the vertical direction of one pixel to the right or left and then a one pixel change in the opposite direction. The area between the single pixel changes is then set to the value before the change. The following pseudo code is a simple example of the vertical jaggy removal technique employed by the present invention:

---
while the next pixel is to the right of the current pixel
    current pixel = next pixel
while next pixel is equal to the current pixel
    current pixel = next pixel
if the next pixel is one pixel to the left of the current pixel
    top of jaggy = current pixel
    current pixel = next pixel
while next pixel is equal to the current pixel
if next pixel is one pixel to the right of the current pixel
    set pixels from top of jaggy to current pixel to
    the top of jaggy pixels value.

---

Figure 14A:
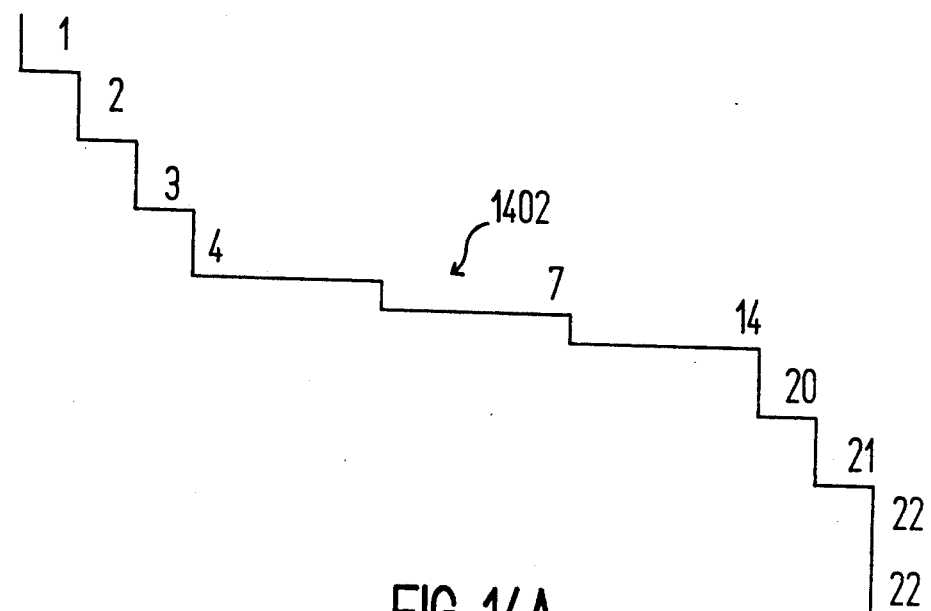
FIGS. 14A and B show horizontal skew correction in conjunction with the present invention.
Figure 14B:
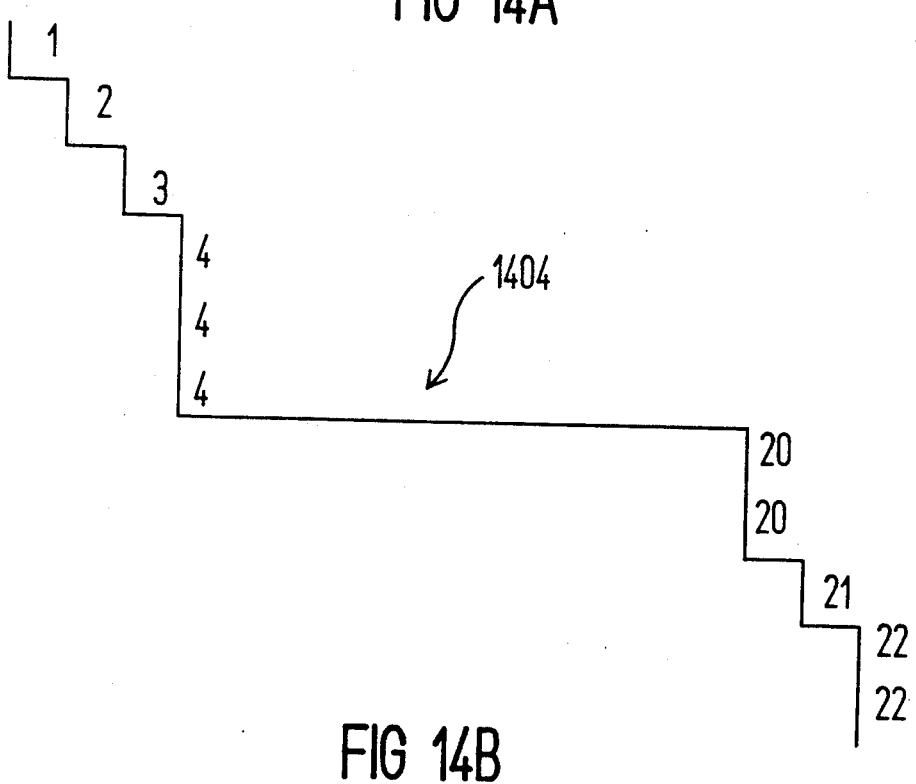

An example of a horizontal skew is shown at 1402 of FIG. 14A. Skew in the horizontal direction is removed by looking for paths with sequences of large changes in the horizontal direction. The values along the skew are then set to the values before the skew and after the skew, as shown at 1403 in FIG. 14B. Note that the value of 7 was changed to 4 and 14 was changed to 20.

Figure 15A:
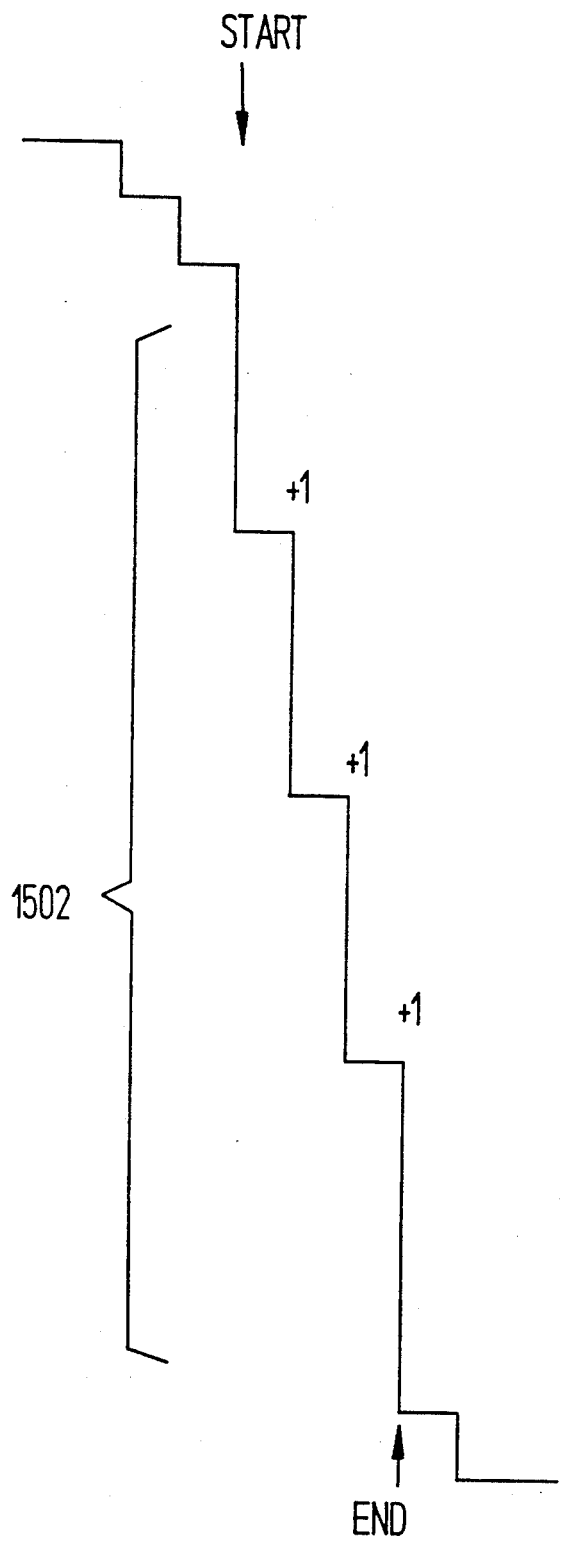
FIGS. 15A and B show vertical skew correction in conjunction with the present invention.
Figure 15B:
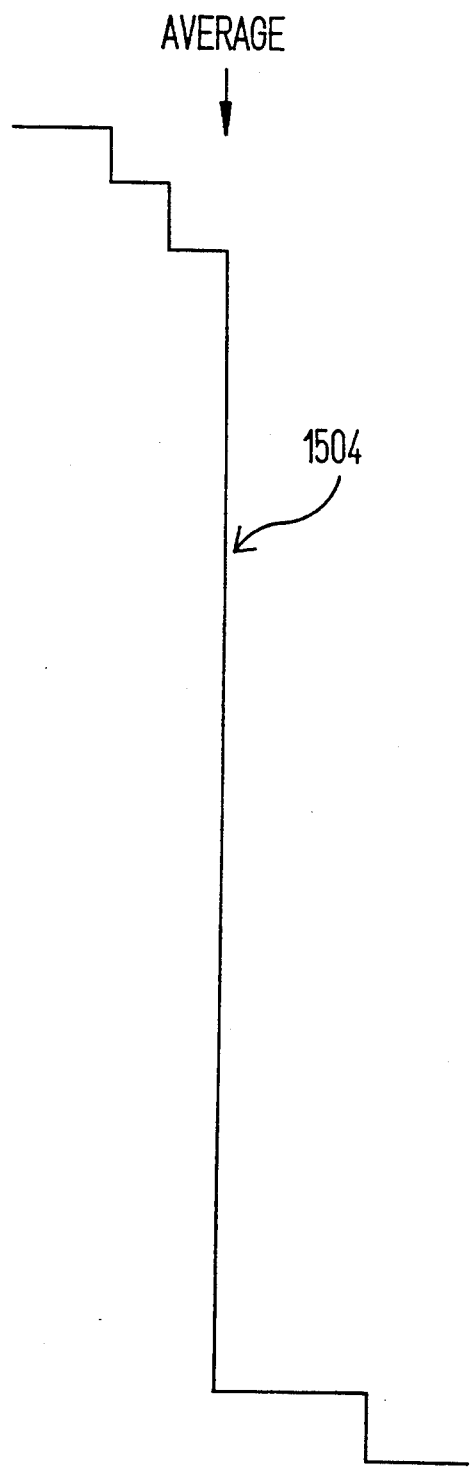

An example of a vertical skew is shown at 1502 of FIG. 15A. Skew in the vertical direction is found by looking for long sequences of the same horizontal position with a change of one pixel between each sequence. Vertical skew is removed by setting all positions to the average value of the start of the skew and the bottom of the skew, as shown at 1504 in FIG. 15B.

Figure 16:
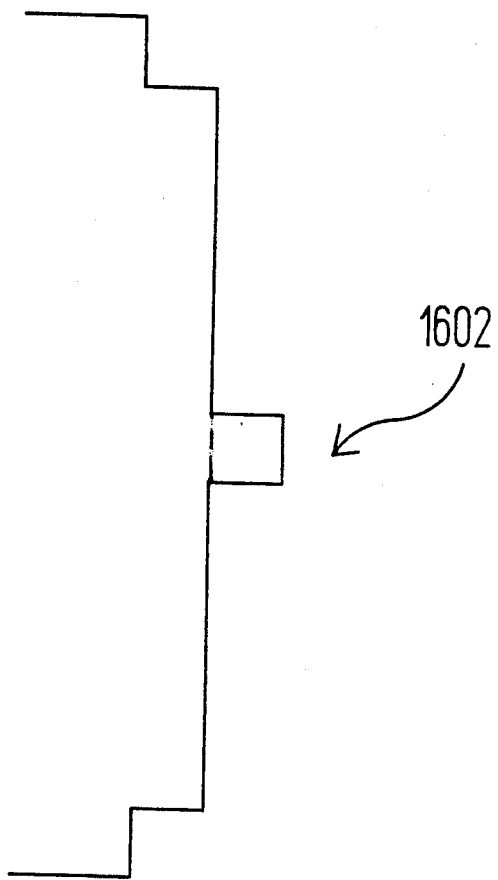
FIG. 16 shows noise removal in conjunction with the present invention.

An example of noise is shown at 1602 of FIG. 16. Noise is any change of one pixel with a change of one pixel in the opposite direction on the next line. Noise is removed by setting the pixel position that changed to the value before it, as shown at 1602 in FIG. 16.

Many skew and noise removal techniques are commonly known in the field, one versed in image processing will readily be able to adapt standard routines to the spot color extraction system of the present invention.

Figure 17:
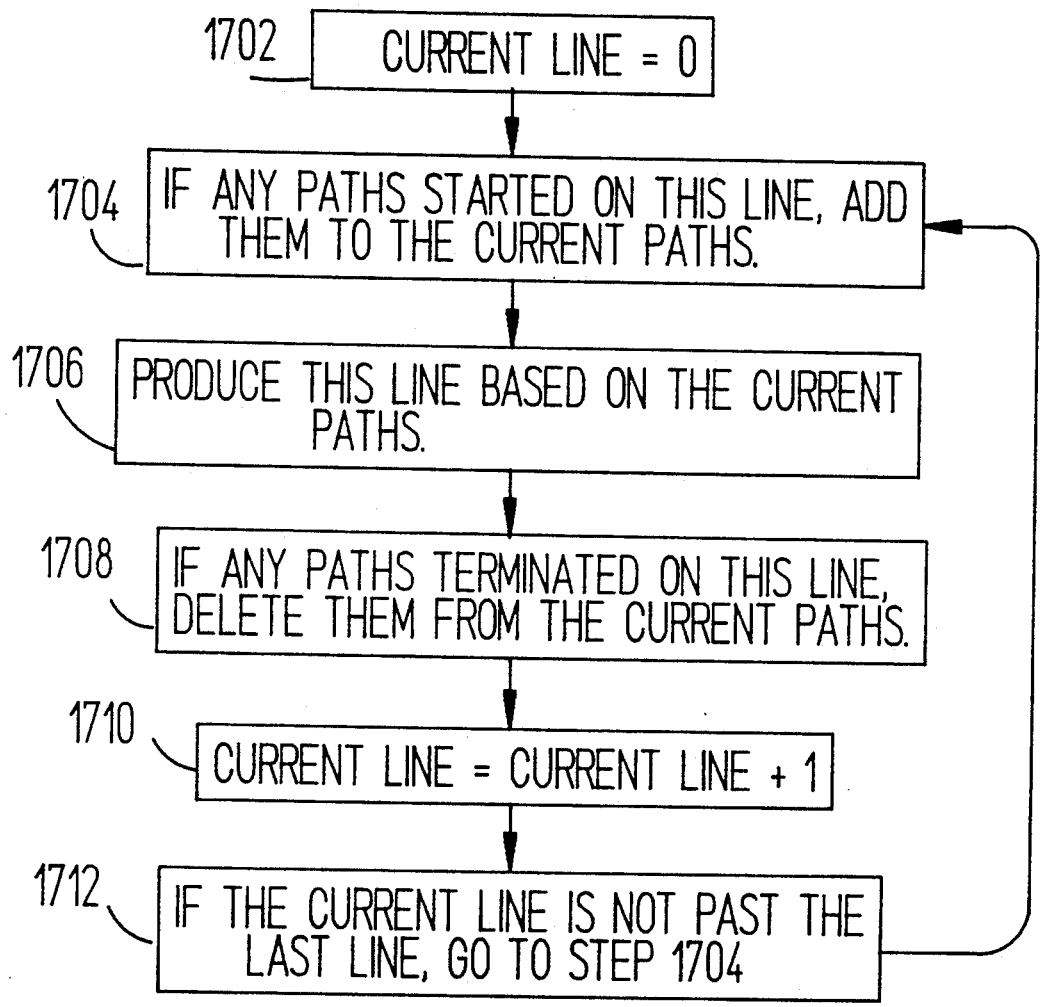
FIG. 17 shows a flow chart depicting an image output operation in conjunction with the present invention.

Finally, an output sequence for the present invention is shown at FIG. 17. The spot color extracted image is recreated in the reverse process of the path formation. The output process begins by setting the current line equal to zero, as shown in step 1702 of FIG. 17. If any path(s) start on this line, they are added to the current path(s), see step 1704. The image line is then created based on the current path(s), see step 1706. As shown at step 1708, if any paths terminated on this line, they are deleted from the current path(s). The current line is incremented, and the process loops back to step 1704 until the last line is reached. See steps 1710 and 1712, respectively.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method for finding areas of similar color in electronically captured spot color images and replacing the similar colors with a single dominant color, comprising the steps of:

(1) scanning an original image at a first resolution to generate an electronic image;

(2) classifying colors in said image using a three dimensional histogram;

(3) identifying a pallet of dominant colors based on said histogram classification;

(4) scanning a plurality of lines of said original image at a second resolution, said second resolution being substantially higher than said first resolution;

(5) processing said scanned lines to determine where within each line different colors exist, the locations of said different colors being noted;

(6) correlating segments of a particular line with other segments of adjacent lines to determine if said noted colors are in similar locations to identify a spatial area of color representing said original; and (7) comparing said spatial areas with said pallet of colors and replacing said noted color of said spatial areas with the closest corresponding pallet color;

wherein at least one of steps (1) through (7) are performed with a computer.

2. A method for finding areas of similar color in electronically captured spot color images and replacing the similar colors with a single dominant color, comprising the steps of:

(1) identifying a pallet of dominant colors for an electronic image having individually scanned lines;

(2) processing said scanned lines to determine spatially adjacent areas of said image with similar colors and noting the color; and (3) comparing said colored areas with said pallet of colors and replacing said noted color of said areas with the closest corresponding color;

wherein at least one of steps (1) through (7) are performed with a computer.

3. A method according to claim 2, wherein said identifying step further comprises the steps of:

(1) scanning said original image at a first resolution to generate said electronic image;

(2) classifying colors in said image using a three dimensional histogram; and (4) scanning a plurality of lines of said original image at a second resolution, said second resolution being substantially higher than said first resolution.

4. A method according to claim 3, wherein the number lines scanned in step 4 is limited to process only a portion of said original.

5. A method according to claim 2, wherein said processing step further comprises the step of correlating segments of a particular line with other segments of adjacent lines to determine if said noted colors are in similar locations to identify a spatial area of color representing said original.

6. A method according to claim 4, wherein said correlating step further comprises using a break out box for processing each line to determine related areas of the line based on color threshold levels of adjacent pixels.

7. A method according to claim 6, wherein the processing of each line further comprising the steps of:

identifying and noting occurrences of color transitions; and identifying and noting occurrences of color plateaus.

8. A method according to claim 6, further comprising the step of color averaging each line to reduce the variance of color per line.

9. A computer system for finding areas of similar color in electronically captured spot color images and replacing the similar colors with a single dominant color, the system comprising:

identifying means for finding a pallet of dominant colors for an electronic image having individually scanned lines;

processing means for processing said scanned lines to determine spatially adjacent areas of said image with similar colors and noting the color; and comparing means for comparing said colored areas with said pallet of colors and replacing said noted color of said areas with the closest corresponding pallet color.

10. A system according to claim 9, wherein said identifying means further comprises:

scanning means for scanning said original image at a first resolution to generate said electronic image;

classifying means for cataloging colors in said image using a three dimensional histogram; and second scanning means for scanning a plurality of lines of said original image at a second resolution, said second resolution being substantially higher than said first resolution.

11. A system according to claim 10, wherein second scanning means only scans a portion of said original.

12. A system according to claim 9, wherein said processing means further comprises means for correlating segments of a particular line with other segments of adjacent lines to determine if said noted colors are in similar locations to identify a spatial area of color representing said original.

13. A system according to claim 11, wherein said correlating means further comprises a break out box for processing each line to determine related areas of the line based on color threshold levels of adjacent pixels.

14. A system according to claim 13, wherein said processing means further comprises:

first means for identifying and noting occurrences of color transitions in each line; and second means for identifying and noting occurrences of color plateaus in each line.

15. A system according to claim 13, further comprising: means for color averaging each line to reduce the variance of color per line.

* * * * *